(12) United States Patent
Fox

(10) Patent No.: US 8,951,155 B2
(45) Date of Patent: Feb. 10, 2015

(54) DIFFERENTIAL HAVING EXTERNALLY MOUNTED PLENUM

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/049,461

(22) Filed: Oct. 9, 2013

(65) Prior Publication Data

US 2014/0179484 A1    Jun. 26, 2014

Related U.S. Application Data

(60) Provisional application No. 61/712,239, filed on Oct. 10, 2012, provisional application No. 61/843,531, filed on Jul. 8, 2013, provisional application No. 61/878,302, filed on Sep. 16, 2013.

(51) Int. Cl.
| | |
|---|---|
| *F16H 48/20* | (2012.01) |
| *F16H 48/30* | (2012.01) |
| *F16H 48/22* | (2006.01) |
| *F16H 48/32* | (2012.01) |
| *F16H 48/08* | (2006.01) |

(52) U.S. Cl.
CPC ............... *F16H 48/22* (2013.01); *F16H 48/32* (2013.01); *F16H 48/08* (2013.01)
USPC .................................. 475/86; 475/74; 475/88

(58) Field of Classification Search
CPC .......... F16H 48/22; F16H 48/30; F16H 48/34
USPC .......................... 475/86, 149, 74, 84, 88, 231
See application file for complete search history.

(56) References Cited

U.S. PATENT DOCUMENTS

| | | | |
|---|---|---|---|
| 5,839,327 A | 11/1998 | Gage | |
| 6,692,396 B1 | 2/2004 | Grogg et al. | |
| 6,733,411 B1 | 5/2004 | Kaplan et al. | |
| 6,902,506 B2 * | 6/2005 | Schrand | 475/86 |
| 7,318,511 B2 | 1/2008 | Grogg | |
| 7,341,136 B2 * | 3/2008 | Park | 192/85.02 |
| 7,353,927 B2 * | 4/2008 | Park | 192/85.02 |
| 7,448,482 B2 * | 11/2008 | Park | 192/85.02 |

* cited by examiner

*Primary Examiner* — Tisha Lewis
(74) *Attorney, Agent, or Firm* — Remarck Law Group PLC

(57) ABSTRACT

A differential gear mechanism can include a differential casing, a piston and an externally mounted plenum assembly. The differential casing can have a differential gear set configured to selectively rotate a first axle shaft and a second axle shaft. The piston can be slidably disposed in the differential casing and configured to actuate a clutch assembly. The externally mounted plenum assembly can include a plenum assembly housing, a hydraulic coupling and a motor mounted on the plenum assembly housing. The plenum assembly housing can define an axle opening configured to receive one of the first and second axle shafts therethrough. The hydraulic coupling can be arranged on the plenum assembly housing at the axle opening. The motor can be configured to pump hydraulic fluid from the externally mounted plenum assembly, through the hydraulic coupling and into the differential casing to act onto the piston.

20 Claims, 10 Drawing Sheets

DIFFERENTIAL HAVING EXTERNALLY MOUNTED PLENUM

CROSS-REFERENCE TO RELATED APPLICATIONS

This application claims the benefit of U.S. Provisional Application No. 61/712,239 which was filed on Oct. 10, 2012, U.S. Provisional Application No. 61/843,531, which was filed on Jul. 8, 2013, and U.S. Provisional Application No. 61/878,302 which was filed on Sep. 16, 2013. The disclosures of each of the above applications are incorporated herein by reference in their entirety.

FIELD

The present disclosure relates generally to differential gear assemblies and more particularly to a differential gear assembly having an externally mounted plenum.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some examples it can be challenging to provide a simple arrangement to deliver hydraulic fluid to the piston without substantial modification of existing hardware.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing defining first and second output shaft openings that are coaxially aligned along an axis of rotation of the differential casing. A piston can be slidably disposed in the differential casing and configured to actuate a clutch assembly. A first and a second side gear can be rotatably mounted within the differential casing. A plurality of pinion gears can be mounted between the first and second side gears. The plurality of pinion gears can be intermeshed with the first and second side gears to form a torque transfer arrangement configured for transferring torque between the pinion gears and the first and second side gears to rotate the first and second side gears about the axis of rotation. An externally mounted plenum assembly can include a plenum assembly housing, a hydraulic coupling and a motor. The plenum assembly housing can define an axle opening configured to receive one of the first and second axle shafts therethrough. The hydraulic coupling can be arranged on the plenum assembly housing at the axle opening. The motor can be mounted on the plenum assembly housing at the axle opening. The motor can be mounted on the plenum assembly housing and be configured to pump hydraulic fluid from the externally mounted plenum assembly, through the hydraulic coupling and into the differential casing to act onto the piston.

According to additional features, the hydraulic coupling can comprise a first slip ring and a second slip ring. The hydraulic coupling can comprise a groove defined in the plenum assembly housing between the first and second slip rings. The externally mounted plenum can further comprise an axle seal arranged around the axle opening.

In other features, the differential gear mechanism can be received by a transaxle housing. The externally mounted plenum assembly can be coupled to the transaxle housing. The plenum assembly housing can define a plurality of mounting passages configured to receive a corresponding plurality of fasteners that threadably mate with threaded bosses defined in the transaxle housing.

According to still other features, the externally mounted plenum assembly can further comprise an accumulator configured to accumulate the hydraulic fluid. The motor can extend along a motor axis. The opening can define an opening axis. The motor axis and the opening axis can be parallel.

A differential gear mechanism constructed in accordance to additional features of the present disclosure can include a differential casing, a piston and an externally mounted plenum assembly. The differential casing can define first and second output shaft openings that are coaxially aligned along an axis of rotation of the differential casing. The differential casing can have a differential gear set configured to selectively rotate a first axle shaft received in the first output shaft opening and a second axle shaft received in the second output shaft opening. The piston can be slidably disposed in the differential casing and configured to actuate a clutch assembly. The externally mounted plenum assembly can include a plenum assembly housing, a hydraulic coupling and a motor mounted on the plenum assembly housing. The plenum assembly housing can define an axle opening configured to receive one of the first and second axle shafts therethrough. The hydraulic coupling can be arranged on the plenum assembly housing at the axle opening. The motor can be configured to pump hydraulic fluid from the externally mounted plenum assembly, through the hydraulic coupling and into the differential casing to act onto the piston.

According to other features, the hydraulic coupling can comprise a first slip ring and a second slip ring. The hydraulic coupling can comprise a groove defined in the plenum assembly housing between the first and second slip rings. The externally mounted plenum can further comprise an axle seal arranged around the axle opening.

In other features, the differential gear mechanism can be received by a transaxle housing. The externally mounted plenum assembly can be coupled to the transaxle housing. The plenum assembly housing can define a plurality of mounting passages configured to receive a corresponding plurality of fasteners that threadably mate with threaded bosses defined in the transaxle housing. The motor can extend along a motor axis. The opening can define an opening axis. The motor axis and the opening axis can be parallel.

A differential gear mechanism constructed in accordance to another example of the present disclosure can include a differential casing defining first and second output shaft openings that are coaxially aligned along an axis of rotation of the differential casing. A piston can be slidably disposed in the differential casing and configured to actuate a clutch assembly. A first and a second side gear can be rotatably mounted within the differential casing. The first and second side gears can be co-axially aligned along the axis of rotation of the differential casing. The first side gear can define a first shaft opening configured to provide a first torque transmitting connection with a first output shaft received within the first output shaft opening. The second side gear can define a second output shaft opening configured to provide a second torque transmitting connection with a second output shaft received within the second output shaft opening. A plurality of pinion gears can be mounted between the first and second side gears. The plurality of pinion gears can be intermeshed with the first and second side gears to form a torque transfer arrangement configured for transferring torque between the pinion gears and the first and second side gears to rotate the first and second side gears about the axis of rotation. An externally mounted plenum assembly can include a plenum assembly housing, a hydraulic coupling and a motor. The plenum assembly housing can define an axle opening configured to receive one of the first and second axle shafts therethrough. The hydraulic coupling can be arranged on the plenum assembly housing at the axle opening. The motor can be mounted on the plenum assembly housing at the axle opening. The motor can be mounted on the plenum assembly housing and be configured to pump hydraulic fluid from the externally mounted plenum assembly, through the hydraulic coupling and into the differential casing to act onto the piston.

According to additional features, the hydraulic coupling can comprise a first slip ring and a second slip ring. The hydraulic coupling can comprise a groove defined in the plenum assembly housing between the first and second slip rings. The externally mounted plenum can further comprise an axle seal arranged around the axle opening.

In other features, the differential gear mechanism can be received by a transaxle housing. The externally mounted plenum assembly can be coupled to the transaxle housing. The plenum assembly housing can define a plurality of mounting passages configured to receive a corresponding plurality of fasteners that threadably mate with threaded bosses defined in the transaxle housing.

BRIEF DESCRIPTION OF THE DRAWINGS

The present disclosure will become more fully understood from the detailed description and the accompanying drawings, wherein.

DETAILED DESCRIPTION

Figure 1:
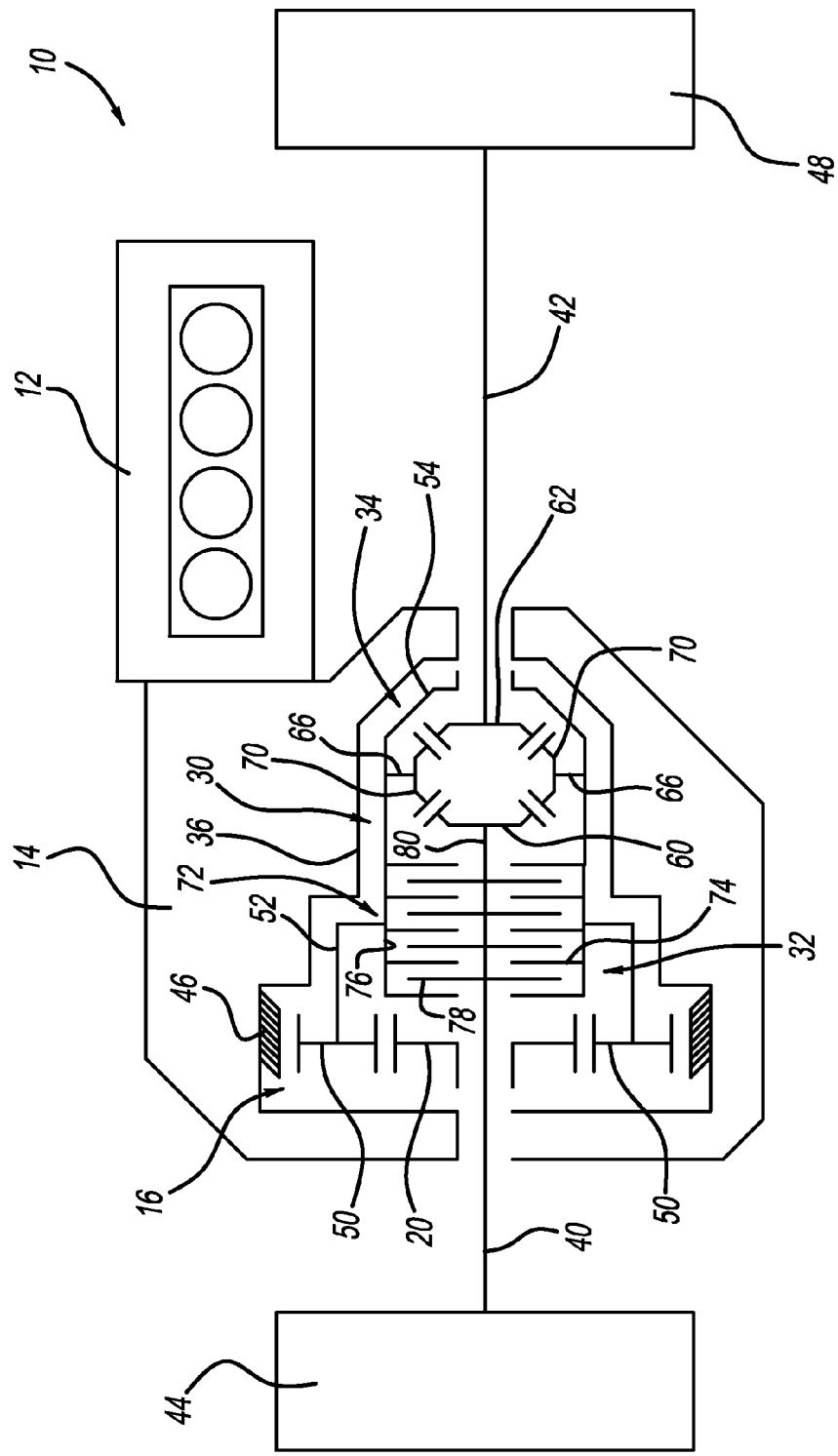
FIG. 1 is schematic of an exemplary vehicle driveline incorporating a differential gear mechanism constructed in accordance to one example of the present disclosure.
Figure 2:
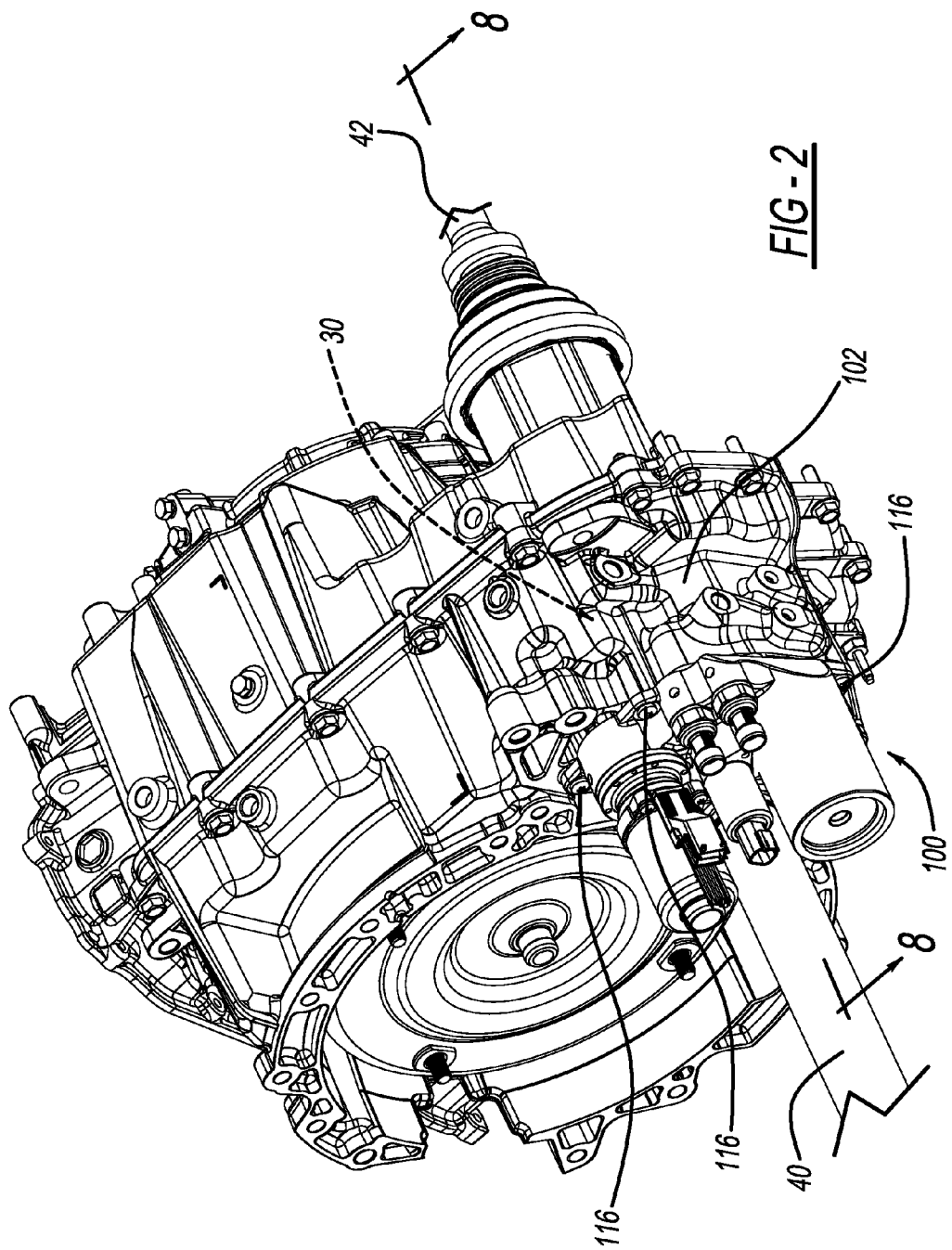
FIG. 2 is perspective view of a transaxle having a limited slip differential assembly and incorporating an externally mounted plenum assembly constructed in accordance to one example of the present disclosure.
Figure 3:
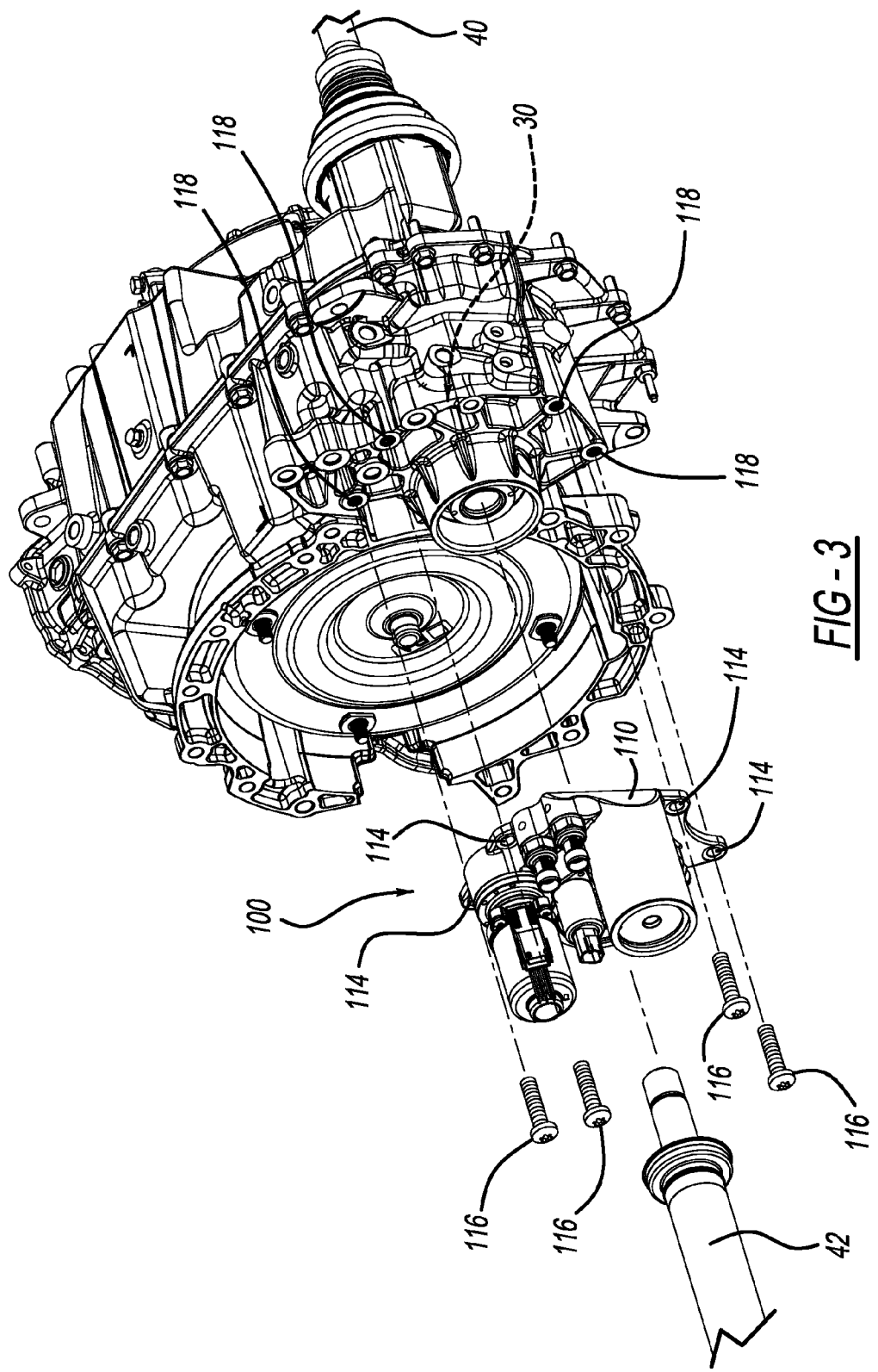
FIG. 3 is a partially exploded first side view of the externally mounted plenum assembly and transaxle having the limited slip differential assembly of FIG. 2.
Figure 4:
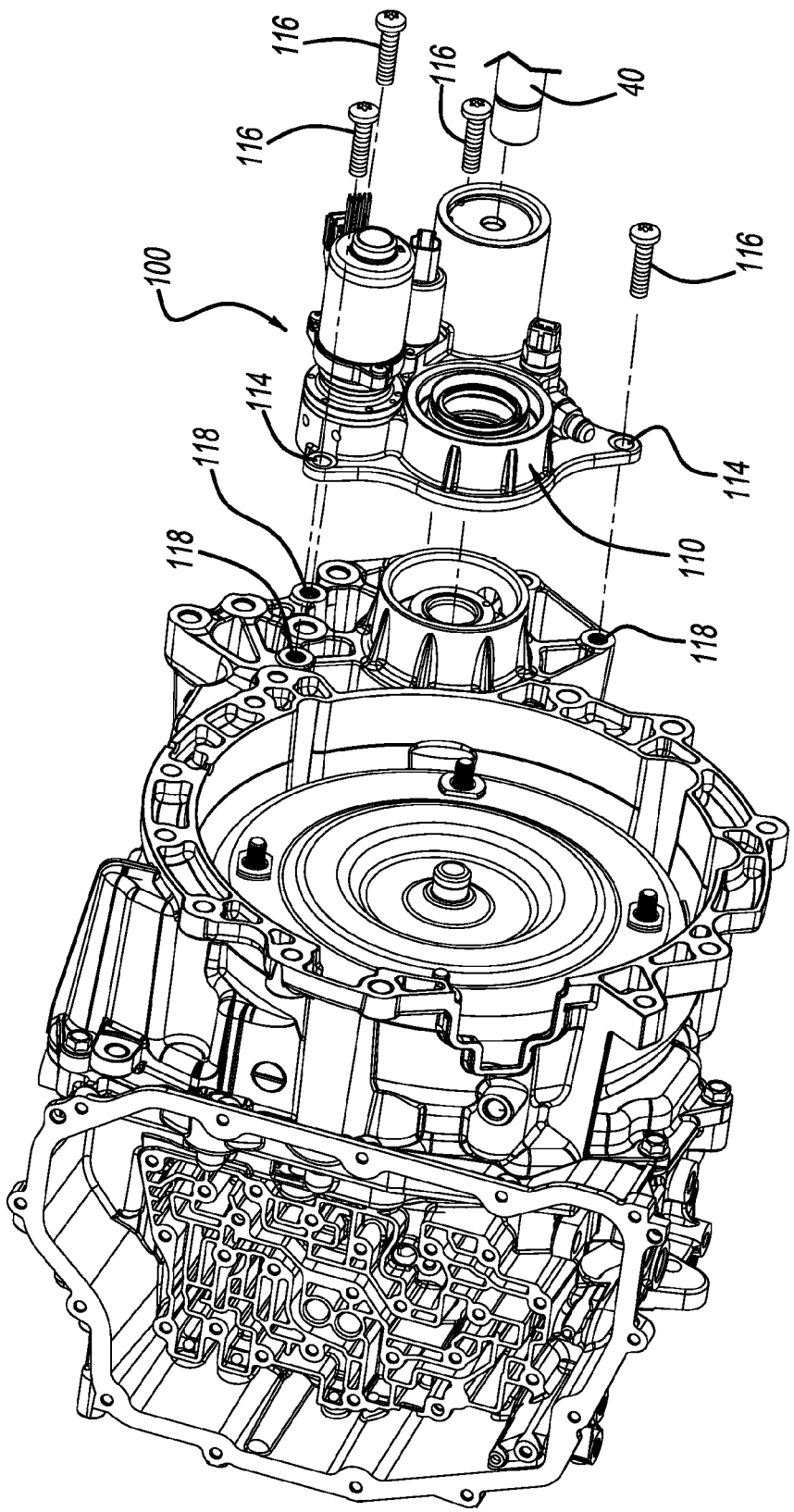
FIG. 4 is a partially exploded second side view of the externally mounted plenum assembly and transaxle having the limited slip differential assembly of FIG. 2.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly or mechanism 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 8:
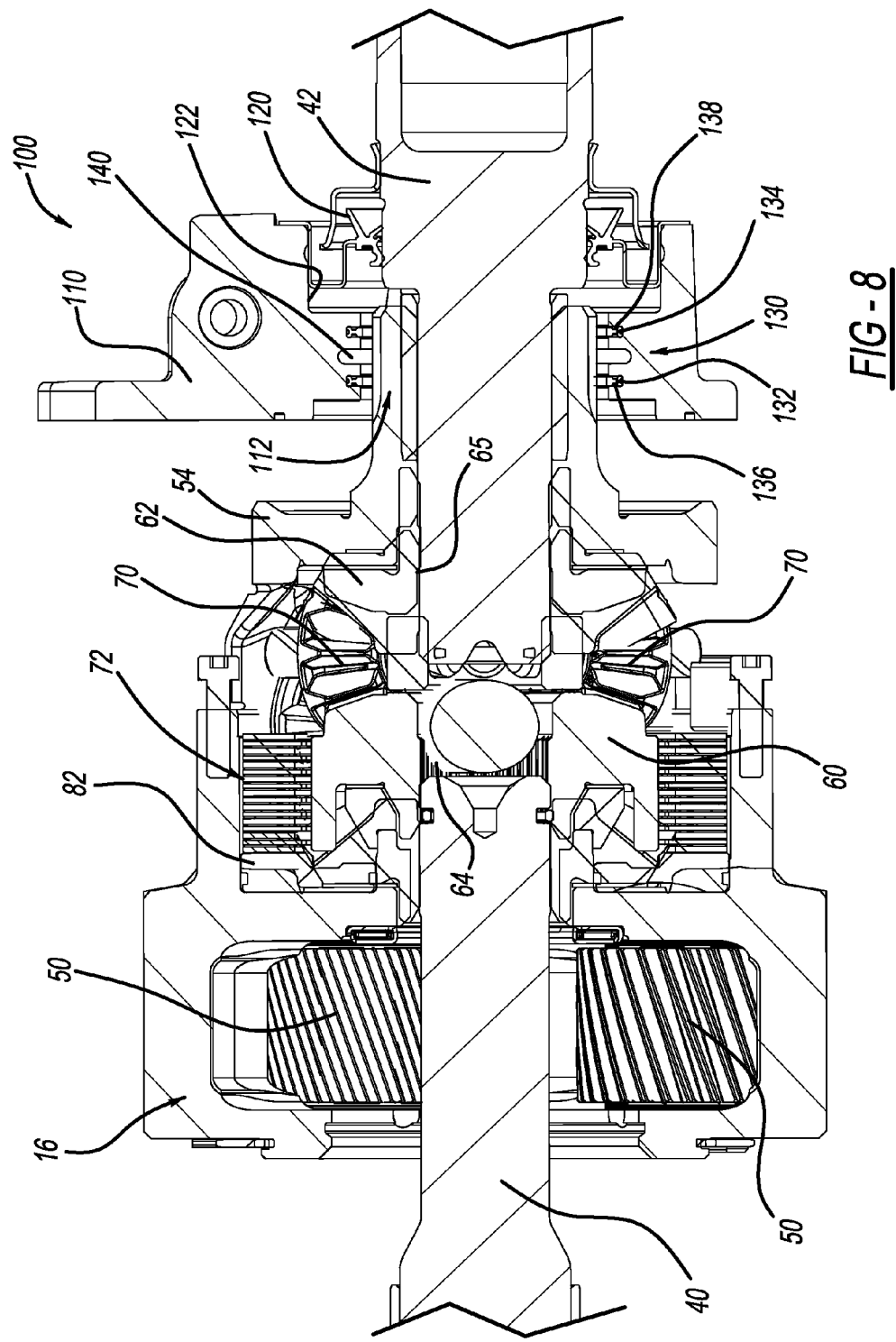
FIG. 8 is a partial cross-sectional view of the electronic limited slip differential and externally mounted plenum assembly taken along lines 8-8 of FIG. 2 shown with the transaxle housing removed for clarity.

The differential gear assembly 34 includes a differential gear set having a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 8). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 that includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 (FIG. 8) to selectively actuate the clutch pack 72 between the open, closed and partially closed configurations.

With additional reference now to FIGS. 2-8, additional features of the differential gear assembly 34 will be described. The differential gear assembly 34 can include an externally mounted plenum assembly 100. In general, the externally mounted plenum assembly 100 can be configured to bolt onto a transaxle housing 102 that houses the limited slip differential assembly 30. The externally mounted plenum assembly 100 provides an arrangement where the plenum is mounted on the outside of the transaxle housing 102 allowing an integrated electronic limited slip differential to be provided without requiring substantial modifications to the transaxle housing 102.

Figure 5:
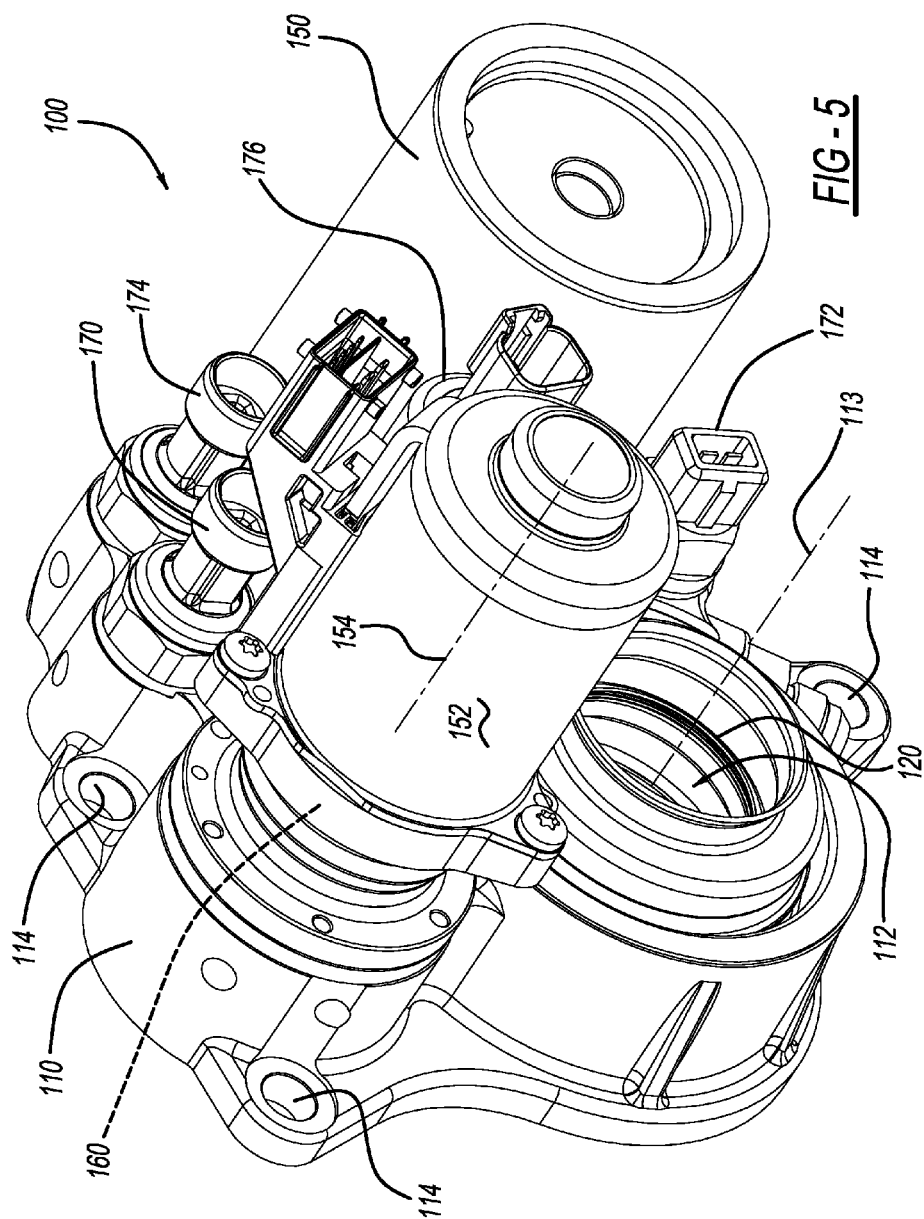
FIG. 5 is a front perspective view of the externally mounted plenum assembly of FIG. 2.
Figure 6:
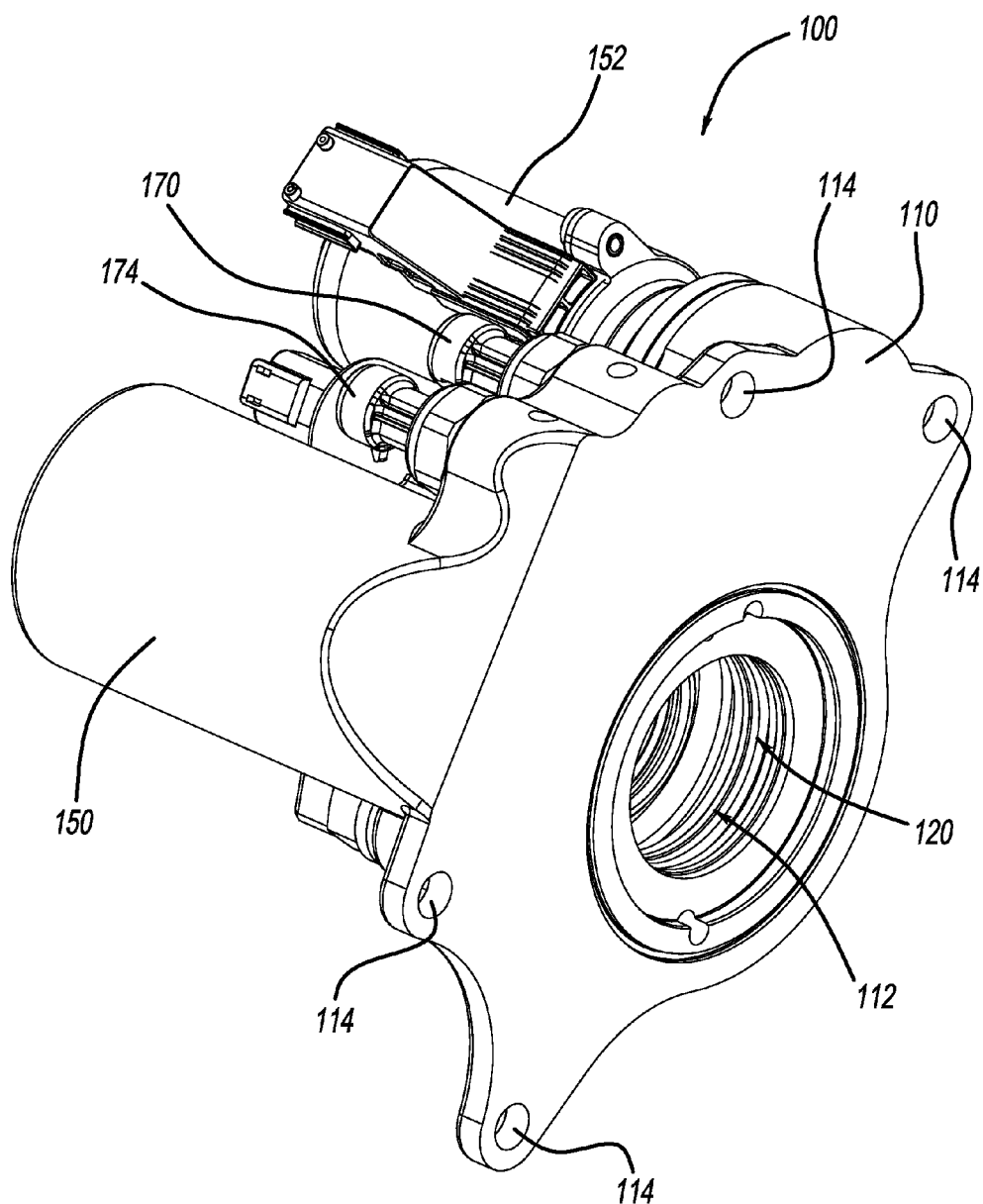
FIG. 6 is a rear perspective view of the externally mounted plenum assembly of FIG. 2.
Figure 7:
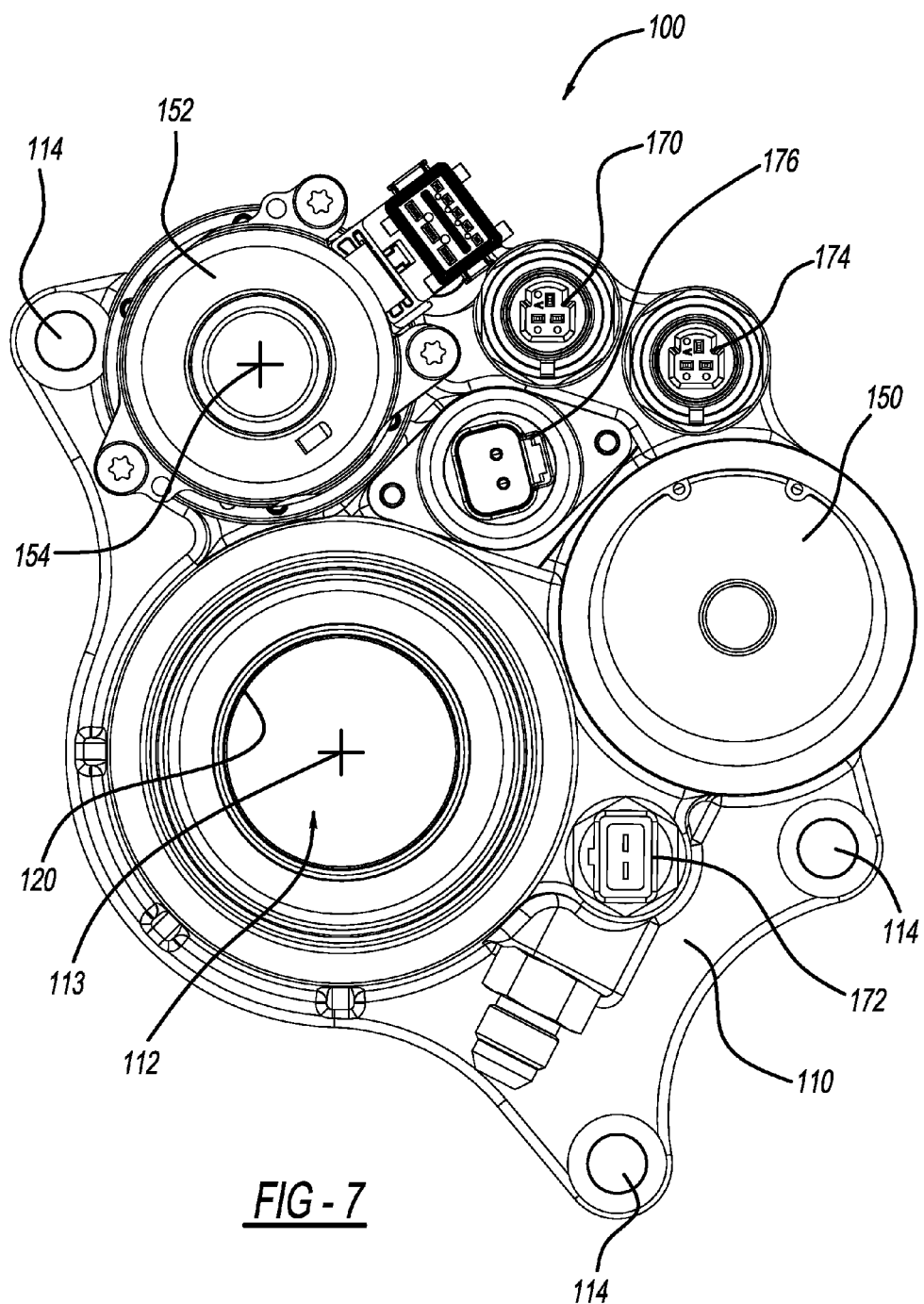
FIG. 7 is an end view of the externally mounted plenum assembly of FIG. 2.

With particular reference now to FIG. 5, the externally mounted plenum assembly 100 can generally include a plenum assembly housing 110 that defines an axle opening 112. The axle opening 112 can extend along an axle opening axis 113 and is configured to receive the axle shaft 42 therethrough (see also FIG. 8). A plurality of mounting passages 114 can be defined through the plenum assembly housing 110. The plurality of mounting passages 114 can be configured to receive a corresponding plurality of fasteners 116 that threadably mate with threaded bores 118 (FIG. 3) defined in the transaxle housing 102. An axle seal 120 can be mounted in a recess 122 defined in the plenum assembly housing 110. The axle seal 120 can include various lips configured to sealingly engage the axle shaft 42.

The plenum assembly housing 110 can include a hydraulic coupling 130 (FIG. 8) arranged at the axle opening 112. In general, the hydraulic coupling 130 can provide a hydraulic connection between the hydraulic fluid pumped from the externally mounted plenum assembly 100 and ultimately to the piston 82 and the clutch assembly 32 of the limited slip differential assembly 30. In one example, the hydraulic coupling 130 can include a first slip ring 132 and a second slip ring 134. The first slip ring 132 can be received in a first groove 136 in the plenum assembly housing 110. The second slip ring 134 can be received in a second groove 138 in the plenum assembly housing 110. A central groove 140 can be defined in the plenum assembly housing 110 between the first and second slip rings 132 and 134. In one example, the first and second slip rings 132 and 134 provide a seal against the differential case 54 such that fluid can be delivered through the central groove 140 and into the differential case and/or any other associated structure such as a journal bearing located at an interface between the plenum assembly housing 110 and the differential case 54.

The externally mounted plenum assembly 100 can further include an accumulator 150 and a motor 152. The accumulator 150 that can be configured to accumulate hydraulic fluid. The motor 152 can extend along a longitudinal motor axis 154 that is parallel to the axle opening axis 113 (FIG. 8). In one example, the motor 152 can operate a gerotor gear assembly 160 (FIG. 5). The gerotor gear assembly 160 can be conventionally constructed and can generally comprise an inner gerotor gear and an outer gerotor gear (not specifically shown). The inner gerotor gear can be coupled for rotation with an output shaft of the motor 152. The operation of the gerotor gear assembly can be conventional where relative rotation of the inner and outer gerotor gears can cause pumping action on the fluid contained in the accumulator 150 of the externally mounted plenum assembly 100 ultimately causing the fluid to be pumped through the hydraulic coupling 130, through the differential case 54 and to the piston 82.

The externally mounted plenum assembly 100 can further include a clutch piston pressure sensor 170, a fluid temperature sensor 172, an accumulator pressure sensor 174 and a three-way proportional regulating valve 176. The clutch piston pressure sensor 170 can be threadably or otherwise securely received by the plenum assembly housing 110. The clutch piston pressure sensor 170 can be configured to measure a pressure at the piston 82. The fluid temperature sensor 172 can be threadably or otherwise securely received by the plenum assembly housing 110. The fluid temperature sensor 172 can be configured to measure a temperature of fluid in the externally mounted plenum assembly 100.

Figure 9:
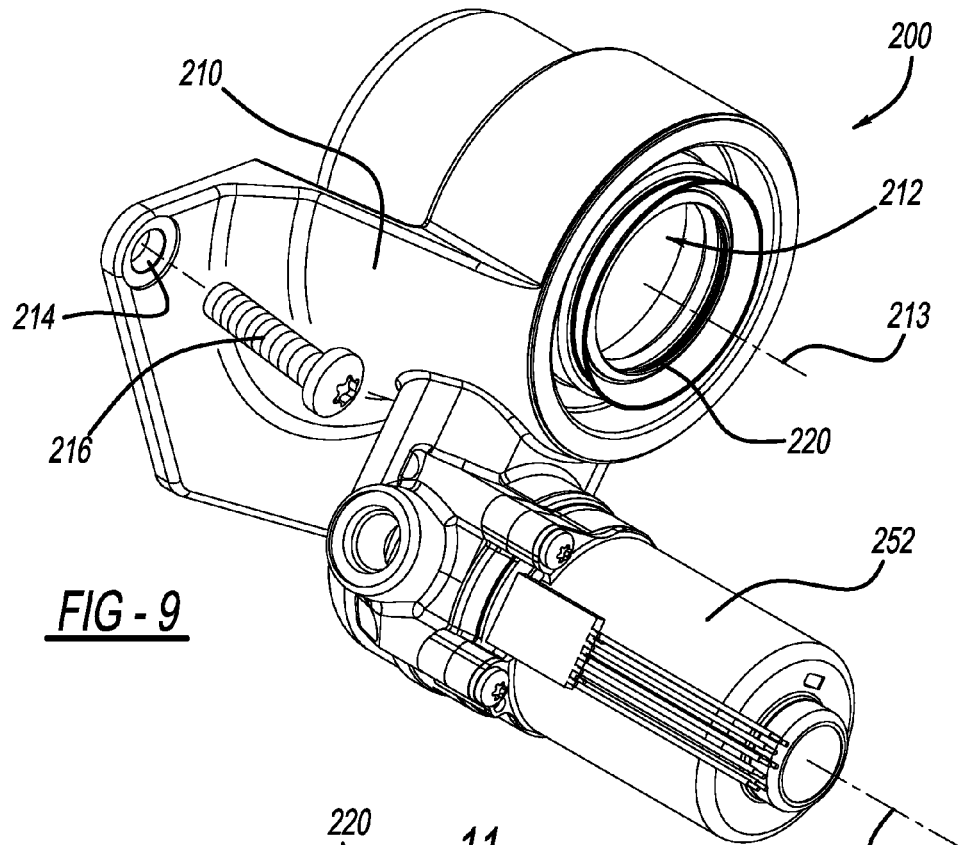
FIG. 9 is a front perspective view of an externally mounted plenum assembly constructed in accordance to additional features of the present disclosure.
Figure 10:
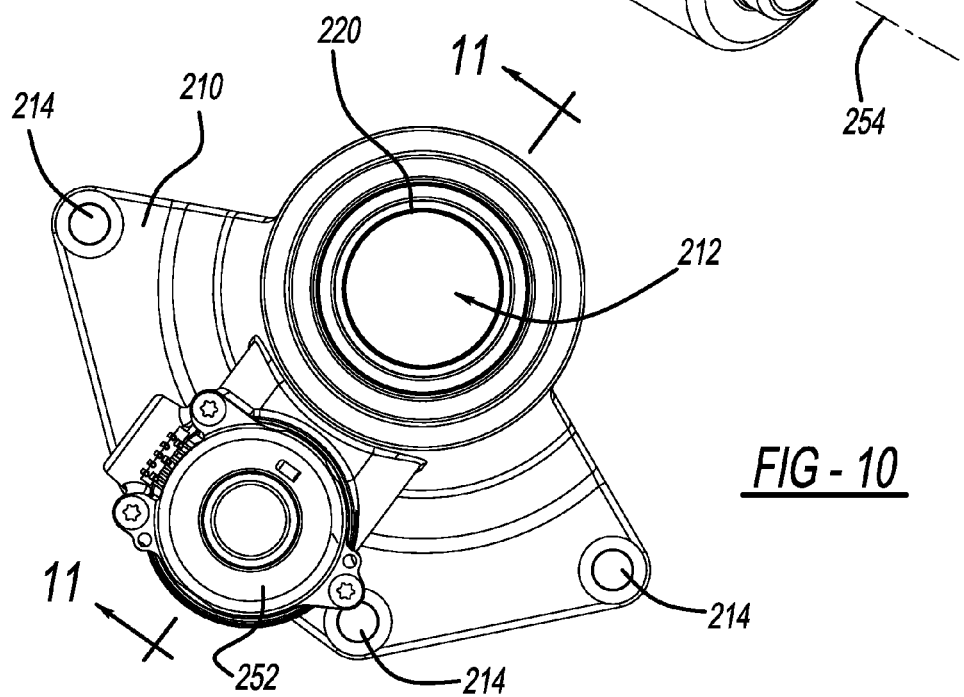
FIG. 10 is an end view of the externally mounted plenum assembly of FIG. 9.
Figure 11:
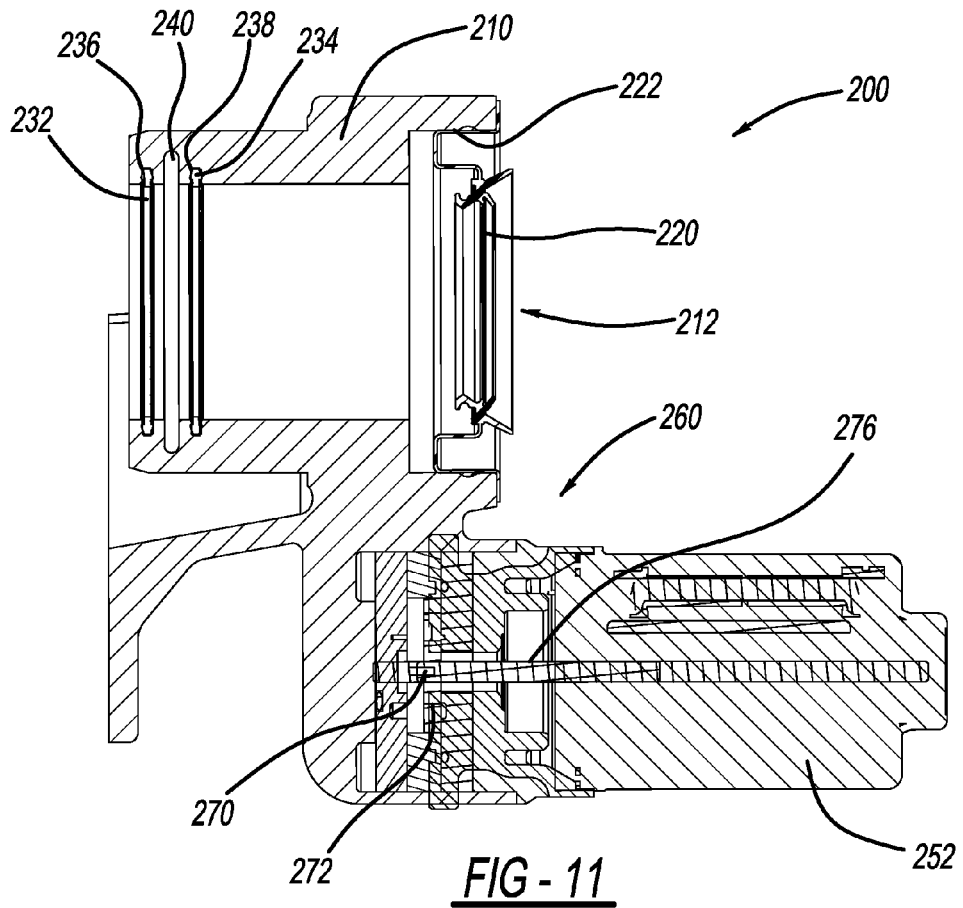
FIG. 11 is a cross-sectional view of the externally mounted plenum assembly taken along lines 11-11 of FIG. 10.

With reference now to FIGS. 9-11, an externally mounted plenum assembly 200 constructed in accordance to another example of the present teachings will be described. The externally mounted plenum assembly 200 can generally include a plenum assembly housing 210 that defines an axle opening 212. The axle opening 212 can extend along an axle opening axis 213 and is configured to receive an axle shaft therethrough. A plurality of mounting passages 214 can be defined through the plenum assembly housing 210. The plurality of mounting passages 214 can be configured to receive a corresponding plurality of fasteners 216 that threadably mate with threaded bores defined in a transaxle housing (not specifically shown). An axle seal 220 can be mounted in a recess 222 defined in the plenum assembly housing 210. The axle seal 220 can include various lips configured to sealingly engage an axle shaft.

The plenum assembly housing 210 can include a hydraulic coupling 230 (FIG. 11) arranged at the axle opening 212. In general, the hydraulic coupling 230 can provide a hydraulic connection between the hydraulic fluid pumped from the externally mounted plenum assembly 200 and ultimately to a piston and clutch assembly of a limited slip differential assembly. In one example, the hydraulic coupling 230 can include a first slip ring 232 and a second slip ring 234. The first slip ring 232 can be received in a first groove 236 in the plenum assembly 210. The second slip ring 234 can be received in a second groove 238 in the plenum assembly housing 210. A central groove 240 can be defined in the plenum assembly housing 210 between the first and second slip rings 232 and 234.

The externally mounted plenum assembly 200 can further include a motor 252. The motor 252 can extend along a longitudinal motor axis 254 (FIG. 9) that is parallel to the axle opening axis 213. In one example, the motor 252 can operate a gerotor gear assembly 260. The gerotor gear assembly 260 can be conventionally constructed and can generally comprise an inner gerotor gear 270 and an outer gerotor gear 272. The inner gerotor gear 270 can be coupled for rotation with an output shaft 276 of the motor 252. The operation of the gerotor gear assembly 260 can be conventional where relative rotation of the inner and outer gerotor gears 270 and 272 can cause pumping action on the fluid contained in the externally mounted plenum assembly 200 ultimately causing the fluid to be pumped through the hydraulic coupling 230, through the differential case and to the piston.

Figure 12:
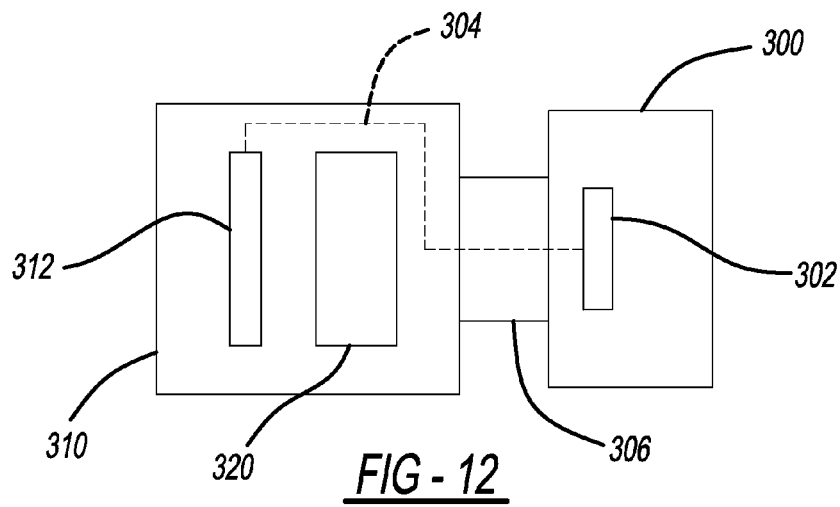
FIG. 12 is a schematic diagram of a hydraulic fluid flow path for an externally mounted plenum assembly communicating hydraulic fluid through a differential casing and to a piston that actuates to open and close a clutch pack.

As discussed in detail above, the externally mounted plenum assemblies 100 and 200 can provide bolt on configurations that can easily mount to a transaxle allowing a hydraulic delivery source to be provided for an electronic limited slip differential without requiring substantial modifications to a transaxle housing. It will be appreciated that the externally mounted plenums 100 and 200 can each be configured to bolt onto other transaxles having other limited slip differentials other than the limited slip differential assembly 30 shown herein. FIG. 12 illustrates a functional diagram of either of the externally mounted plenum assemblies 100 and 200 represented as an externally mounted plenum assembly 300. The externally mounted plenum assembly 300 has a motor 302 that pumps hydraulic fluid along a fluid flow path 304 through a hydraulic coupling 306, through a differential case 310 and to a piston 312. Hydraulic fluid can act on the piston 312 to actuate a clutch assembly 320.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
a differential casing defining first and second output shaft openings that are co-axially aligned along an axis of rotation of the differential casing;
a piston slidably disposed in the differential casing and configured to actuate a clutch assembly;
a first and a second side gear rotatably mounted within the differential casing;
a plurality of pinion gears mounted between the first and second side gears, the plurality of pinion gears intermeshing with the first and second side gears to form a torque transfer arrangement configured for transferring torque between the pinion gears and the first and second side gears to rotate the first and second side gears about the axis of rotation; and
an externally mounted plenum assembly comprising:
a plenum assembly housing that defines an axle opening configured to receive one of the first and second axle shafts therethrough;
a hydraulic coupling arranged on the plenum assembly housing at the axle opening; and
a motor mounted on the plenum assembly housing and configured to pump hydraulic fluid from the externally mounted plenum assembly, through the hydraulic coupling and into the differential casing to act onto the piston.

2. The differential gear mechanism of claim 1 wherein the hydraulic coupling comprises a first slip ring and a second slip ring.

3. The differential gear mechanism of claim 2 wherein the hydraulic coupling comprises a groove defined in the plenum assembly housing between the first and second slip rings.

4. The differential gear mechanism of claim 2 wherein the externally mounted plenum further comprises an axle seal arranged around the axle opening.

5. The differential gear mechanism of claim 1, wherein the differential gear mechanism is received by a transaxle housing and wherein the externally mounted plenum assembly is coupled to the transaxle housing.

6. The differential gear mechanism of claim 5 wherein the plenum assembly housing defines a plurality of mounting passages configured to receive a corresponding plurality of fasteners that threadably mate with threaded bosses defined in the transaxle housing.

7. The differential gear mechanism of claim 3 wherein the externally mounted plenum assembly further comprises an accumulator configured to accumulate the hydraulic fluid.

8. The differential gear mechanism of claim 1 wherein the motor extends along a motor axis and wherein the opening defines an opening axis, wherein the motor axis and the opening axis are parallel.

9. A differential gear mechanism comprising:
a differential casing defining first and second output shaft openings that are co-axially aligned along an axis of rotation of the differential casing, the differential casing having a differential gear set configured to selectively rotate a first axle shaft received in the first output shaft opening and a second axle shaft received in the second output shaft opening;
a piston slidably disposed in the differential casing and configured to actuate a clutch assembly; and
an externally mounted plenum assembly comprising:
  a plenum assembly housing that defines an axle opening configured to receive one of the first and second axle shafts therethrough;
  a hydraulic coupling arranged on the plenum assembly housing at the axle opening; and
  a motor mounted on the plenum assembly housing and configured to pump hydraulic fluid from the externally mounted plenum assembly, through the hydraulic coupling and into the differential casing to act onto the piston.

10. The differential gear mechanism of claim 9 wherein the hydraulic coupling comprises a first slip ring and a second slip ring.

11. The differential gear mechanism of claim 10 wherein the hydraulic coupling comprises a groove defined in the plenum assembly housing between the first and second slip rings.

12. The differential gear mechanism of claim 10 wherein the externally mounted plenum further comprises an axle seal arranged around the axle opening.

13. The differential gear mechanism of claim 9 wherein the differential gear mechanism is received by a transaxle housing and wherein the externally mounted plenum assembly is coupled to the transaxle housing.

14. The differential gear mechanism of claim 13 wherein the plenum assembly housing defines a plurality of mounting passages configured to receive a corresponding plurality of fasteners that threadably mate with threaded bosses defined in the transaxle housing.

15. The differential gear mechanism of claim 9 wherein the motor extends along a motor axis and wherein the opening defines an opening axis, wherein the motor axis and the opening axis are parallel.

16. A differential gear mechanism comprising:
a differential casing defining first and second output shaft openings that are co-axially aligned along an axis of rotation of the differential casing;
a piston slidably disposed in the differential casing and configured to actuate a clutch assembly;
a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
a plurality of pinion gears mounted between the first and second side gears, the plurality of pinion gears intermeshing with the first and second side gears to form a torque transfer arrangement configured for transferring torque between the pinion gears and the first and second side gears to rotate the first and second side gears about the axis of rotation; and
an externally mounted plenum assembly comprising:
  a plenum assembly housing that defines an axle opening configured to receive one of the first and second axle shafts therethrough;
  a hydraulic coupling arranged on the plenum assembly housing at the axle opening; and
  a motor mounted on the plenum assembly housing and configured to pump hydraulic fluid from the externally mounted plenum assembly, through the hydraulic coupling and into the differential casing to act onto the piston.

17. The differential gear mechanism of claim 16 wherein the hydraulic coupling comprises a first slip ring and a second slip ring.

18. The differential gear mechanism of claim 17 wherein the hydraulic coupling comprises a groove defined in the plenum assembly housing between the first and second slip rings.

19. The differential gear mechanism of claim 17 wherein the externally mounted plenum further comprises an axle seal arranged around the axle opening.

20. The differential gear mechanism of claim 16 wherein the differential gear mechanism is received by a transaxle housing and wherein the externally mounted plenum assembly is coupled to the transaxle housing and wherein the plenum assembly housing defines a plurality of mounting passages configured to receive a corresponding plurality of fasteners that threadably mate with threaded bosses defined on the transaxle housing.

* * * * *